United States Patent [19]

Anderson

[11] 4,122,067
[45] Oct. 24, 1978

[54] PROCESS OF REACTING A POLYEPOXIDE COMPOUND WITH A PHENOL IN AQUEOUS MEDIUM

[75] Inventor: Terry Leroy Anderson, Louisville, Ky.

[73] Assignee: Celanese Polymer Specialties Company, Louisville, Ky.

[21] Appl. No.: 840,360

[22] Filed: Oct. 7, 1977

[51] Int. Cl.$^2$ .............................................. C08G 59/02
[52] U.S. Cl. ............................... 528/89; 260/29.2 EP; 260/13; 528/86; 528/88; 528/93; 528/102; 528/104
[58] Field of Search ..................... 260/29.2 EP, 47 EP

[56] References Cited

U.S. PATENT DOCUMENTS

| | | | |
|---|---|---|---|
| 2,506,486 | 5/1950 | Bender et al. | 260/47 |
| 2,602,075 | 7/1952 | Carpenter et al. | 260/47 |
| 2,615,008 | 10/1952 | Greenlee | 260/47 |
| 3,020,250 | 2/1962 | Norwalk | 260/7 |
| 3,296,157 | 1/1967 | Brojer et al. | 260/13 |
| 3,336,257 | 8/1967 | Alvey | 260/47 |
| 3,477,990 | 11/1969 | Dante et al. | 260/47 |
| 3,547,881 | 12/1970 | Mueller et al. | 260/47 |
| 3,824,212 | 7/1974 | Sinnema et al. | 260/47 |
| 3,842,037 | 10/1974 | Sinnema et al. | 260/47 |
| 3,879,324 | 4/1975 | Timmons et al. | 260/29.2 EP |
| 3,919,169 | 11/1975 | Ramsey et al. | 260/47 EP |
| 3,931,109 | 1/1976 | Martin | 260/47 EP |
| 3,945,964 | 3/1976 | Hastings et al. | 260/29.6 NR |
| 3,948,855 | 4/1976 | Perry | 260/47 EP |
| 3,978,027 | 8/1976 | Marshall | 260/47 EP |

*Primary Examiner*—Harold D. Anderson
*Assistant Examiner*—E. A. Nielsen
*Attorney, Agent, or Firm*—Herbert P. Price; K. A. Genoni; T. J. Morgan

[57] ABSTRACT

Polyhydroxypolyether resins are prepared by reacting in water as a dispersion an epoxide compound which has more than one 1,2-epoxy group per molecule with a dihydric phenol. The reaction is conducted in the presence of a nonionic dispersant at a temperature of about 80° C. to about 100° C. using, as a catalyst, an organic phosphine, a tertiary amine, or a quaternary ammonium or phosphonium compound. The polyhydroxypolyether resins are useful in coating compositions, molding compounds, encapsulating compositions, adhesives and the like.

15 Claims, No Drawings

PROCESS OF REACTING A POLYEPOXIDE COMPOUND WITH A PHENOL IN AQUEOUS MEDIUM

BACKGROUND OF THE INVENTION

The field of art to which this invention pertains is synthetic resins made from phenols and a reactant containing epoxy groups.

It is well known in the art to prepare higher molecular weight polyhydroxypolyether resins by reacting a vicinal epoxy-containing compound with a phenolic hydroxyl-containing compound in the presence of such catalysts as organic phosphines, tertiary amines, and quaternary phosphonium, or ammonium compounds. Such reactions are generally conducted in bulk in the absence of a solvent at temperatures of 150° C. to 250° C. or higher. Due to the exothermic reaction of the epoxy group and phenolic group, the rate of reaction and increase in temperature is sometimes difficult to control. High temperatures are also required to keep the reactants in a fluid state and to keep the reaction product fluid so that it can be removed from the reactor. Such high temperatures can result in dark colored products and undesirable side reactions which can cause branching and wide distributions in molecular weights. The reaction can also continue during the long cool down time leading to higher molecular weights than desired and to stability problems. The products obtained by the bulk reaction must be pulverized or flaked in order to be useful.

SUMMARY OF THE INVENTION

This invention pertains to a process for preparing polyhydroxypolyether resins involving the reaction of epoxy-containing compounds with phenolic hydroxyl-containing compounds. In particular this invention relates to a process for preparing polyhydroxypolyether resins wherein epoxy-containing compounds and phenolic hydroxyl-containing compounds are reacted in water as a dispersion.

By the process of this invention, polyhydroxypolyether resins are prepared by reacting an epoxy-containing compound which has more than one 1,2-epoxy group per molecule with a dihydric phenol in the molar ratio of 2:1 to 1:2 using as a catalyst an organic phosphine, a tertiary amine, or a quaternary ammonium or phosphonium compound. The process is conducted as a dispersion in water in the presence of a nonionic dispersant at a temperature of about 80° C. to about 100° C.

By using water as the reaction medium the reaction can be conducted at a low temperature and at a reasonable reaction rate, a time of about 1 to about 8 hours. Lighter colored resins with better molecular weight distribution are obtained by this process when compared to the conventional bulk or solvent processes. The polyhydroxypolyether resin product can be recovered in granular form or as a stable aqueous dispersion.

DESCRIPTION OF THE INVENTION

The epoxide compounds contemplated for use in this invention are those which contain more than one but no more than two 1,2-epoxy groups per molecule and no other groups which are interferingly reactive with epoxy or phenolic groups. The epoxide compounds can be aromatic, aliphatic, cycloaliphatic, saturated or unsaturated and monomeric or polymeric in nature. Such epoxide compounds are epoxidized diolefins, for example, butadiene dioxide, hexadiene dioxide, vinyl cyclohexene dioxide and dipentene dioxide, and glycidyl esters of dicarboxylic acids, the acids including adipic acid, azelaic acid, sebacic acid, dimer acids of unsaturated fatty acids, phthalic acid, isophthalic acid, terephthalic acid and hexahydrophthalic acid.

Additional epoxide compounds are glycidyl ethers of dihydric alcohols, the dihydric alcohols being ethylene glycol, propylene glycol, hexylene glycol, diethylene glycol, polyethylene glycols, polypropylene glycols, polybutylene glycols, dihydroxyalkyl ethers of dihydric phenols and the like.

Preferred epoxide compounds are glycidyl polyethers of dihydric phenols which are derived from epihalohydrins and dihydric phenols. Low molecular weight glycidyl polyethers are prepared by reacting a dihydric phenol with an epihalohydrin in an excess of epihalohydrin using an alkali as the condensation and dehydrohalogenation agent, the ratio of reactants being 1 mol of dihydric phenol to about 2 to about 10 mols of epihalohydrin and about 2 equivalents of alkali. Somewhat higher molecular weight glycidyl polyethers are made using less than 2 mols of epihalohydrin (1.2 to 2 mols) to 1 mol of dihydric phenol with the alkali used being approximately equivalent to the epihalohydrin employed. These glycidyl polyethers of dihydric phenols contain more than one to about two 1,2-epoxy groups per molecule.

The dihydric phenols from which the glycidyl polyethers are derived are those dihydric phenols which contain two phenolic hydroxyl groups and are free from other groups which are normally reactive with epoxy groups. Useful dihydric phenols include p,p'-dihydroxydiphenyl propane, commonly known as Bisphenol A, resorcinol, 1,4-dihydroxynaphthalene, p,p'-dihydroxydiphenyl methane, dihydroxydiphenyl, dihydroxydiphenyl sulfone, and chlorinated and brominated derivatives, such as tetrabromo- and tetrachloro- Bisphenol A.

The epoxy compounds useful in this invention have widely ranging molecular weights and melting points. The molecular weights can be as low as about 100 up to about 2000. The compounds are liquid at room temperature or have melting points as high as about 125° C. The preferred epoxy compounds are glycidyl polyethers of dihydric phenols having molecular weights of about 340 to about 1000 and melting points from below room temperature to about 75° C. The most preferred epoxy compound is the diglycidyl ether of Bisphenol A having an epoxide equivalent weight of about 180 to about 225.

The dihydric phenols which can be reacted by the process of this invention with the epoxide compounds are the same as those described above under the description of useful glycidyl polyethers of dihydric phenols. By using various combinations of epoxide compounds and dihydric phenols, polyhydroxypolyether resins having a wide range of physical and chemical properties can be produced.

The catalysts used in the process of this invention are organic phosphines, tertiary amines and quaternary ammonium, or phosphonium compounds. The organic phosphines can be exemplified by the formula $P(R)_3$ wherein each R is an organic radical. The organic radicals can be aliphatic, cycloaliphatic or aromatic, can contain from about 1 to about 18 carbon atoms and can be the same or different. Examples of useful phosphines are triphenyl phosphine, tricyclohexyl phosphine, trioctyl phosphine, tributyl phosphine, diphenyl cyclohexyl phosphine, trixylyl phosphine, tridodecyl phosphine, cyclohexyl dioctyl phosphine and the like.

The tertiary amines useful in this invention are those mono- or polyamines having an open chain or cyclic structure which have all of the amine hydrogens replaced by hydrocarbon or substituted hydrocarbon radicals. Such radicals are aliphatic, cycloaliphatic or aromatic and contain from 1 to 18 carbon atoms per radical. Examples of useful tertiary amines are benzyldimethylamine, methyldiethanolamine, triethylamine, tributylamine, triphenylamine, tricyclohexylamine, pyridine and quinoline.

The onium compounds useful in this invention are ammonium and phosphonium hydroxides and salts of the hydroxides with organic and inorganic acids. These onium compounds can be represented by the formulae

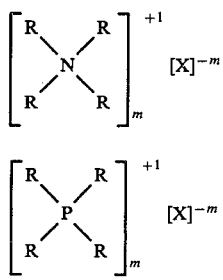

wherein R is an aliphatic, cycloaliphatic or aromatic hydrocarbon radical containing from 1 to about 18 carbon atoms, X is a hydroxide ion or an ion of an organic or inorganic acid and $m$ is the valency of the X ion and is an integer of 1 to 3. Examples of useful onium compounds are benzyltrimethylammonium hydroxide, benzyltrimethylammonium chloride, benzyltrimethylammonium bromide, benzyltrimethylammonium acetate, diphenyldimethylammonium nitrate, diphenyldimethylammonium formate, cyclohexyltrimethylammonium bromide, phenyltrioctylammonium chloride, tetraoctylammonium iodide, triphenylmethylphosphonium iodide, diethyldibutylphosphonium nitrate, benzyltrimethylphosphonium bromide and the like.

The amount of catalyst employed can vary over a considerable range. In general, the amount of catalyst will vary from about 0.03 to about 3% by weight, and more preferably from about 0.05 to about 0.5% by weight.

The dispersants used in carrying out the process of this invention are nonionic in nature. Useful nonionic dispersants are hydroxyethyl cellulose, block polymers made by reacting ethylene oxide with polypropylene glycol and polymers made by reacting polyoxyethylene glycols with polyglycidyl polyethers of polyhydric phenols.

The hydroxyethyl cellulose used in this invention forms water soluble colloids and generally has an M.S. of about 1 to about 3, preferably 1.5 to 2.5. M.S. as used herein is mols of substitution per anhydroglucose unit.

The block polymer dispersants useful in this invention have a hydrophile-lipophile balance (HLB) of at least about 24 up to about 32, and, preferably, an HLB range of about 25 to about 29. These HLB values are determined experimentally using the method of Becher, P., et al, J. Am. Oil Chem. Soc., 41, 169 (1964). Dispersants with HLB values are listed in McCutcheon's "Detergents & Emulsifiers" 1975 North American Edition. Particularly preferred block polymer dispersants are the "Pluronics", which is the trademark of BASF Wyandotte Chemicals Corporation.

Other useful dispersants are those polymers made by reacting polyoxyethylene glycols with polyglycidyl polyethers of polyhydric phenols, as described in copending application, Ser. No. 770,534, filed Feb. 22, 1977. The polyoxyethylene glycols have molecular weights of about 2,000 to about 20,000 and the polyglycidyl polyethers have molecular weight of about 300 to about 2,000. The polyoxyethylene glycols and polyglycidyl polyethers are reacted in the molar ratios of 2:1 to 6:5. These nonionic dispersants have calculated HLB values of about 16 to about 19.5, using the method for calculating HLB as described in "Encyclopedia of Chemical Technology" by Kirk-Othmer, Volume 8, page 131, Interscience Publishers (1965). The HLB value is 1/5 the weight percent hydrophile portion of the molecule.

The amount of dispersant used in the process of this invention will vary from about 0.1% to about 15% by weight based on the weight of reactants. The hydroxyethyl cellulose dispersants will generally be used in amounts in the lower end of the range, e.g., from about 0.1% to about 5%, preferably about 0.5% to about 2%, while the other nonionic dispersants will be used in the higher end of the range, e.g., from about 5% to about 15% by weight. Mixtures of the dispersants can also be used.

In conducting the process of this invention, the solids content of the reaction mixture can be varied from about 40 weight percent to about 90 weight percent. When the reaction is carried out at a solids content in the lower end of the range, i.e., within the range of about 40 to about 75 weight percent, the particle size of the reaction product will be about 10 to about 500 microns, and the resulting dispersion will be unstable with the dispersed particles settling out of the water. The reaction product can be readily separated from the water by decantation, filtration or centrifugation.

When the reaction is conducted with the solids in the 75 to 90 weight percent range, the size of the dispersed particles will vary from about 0.5 to about 10 microns. The resulting dispersion will be stable with little or no non-redispersible settling.

In carrying out the process of this invention, the reaction components, i.e., the epoxide resin, dihydric phenol, catalyst, dispersant and water are added in any order, heat and agitation are applied and the reaction is conducted at a temperature of about 80° C. to about 100° C. for a time sufficient to complete the epoxide group-phenolic group reaction as determined by epoxide equivalent weight determinations, or by phenolic hydroxyl content. Preferably, the epoxide resin and dihydric phenol are heated to a molten state followed by addition of the water, catalyst and dispersant. When the reaction is completed, the product is then recovered in the form of solid beads or as a dispersion which can be further modified for application properties.

The process can also be conducted by heating the epoxide resin and dihydric phenol to a molten state followed by addition of water and catalyst to form a mixture of resinous component and water which is like taffy in consistency and appearance. The epoxidephenol reaction is then partially or completely conducted, the extent of reaction being governed by the viscosity of the taffy-like mixture which must remain in a plastic, fluid or semi-fluid state at the reaction temperature of 80° C. to 100° C. The dispersant with or without additional water is then added with agitation to form solid beads or a dispersion of the reaction product. The epoxide-phenol reaction is then completed, if necessary, by heating at 80° C. to 100° C. and the product is recovered as solid beads or as a stable dispersion.

By the process of this invention, a wide variety of polyhydroxy polyether resins can be prepared by varying the epoxy reactant to phenolic reactant within the molar ratio of 2:1 to 1:2. When more than 1 up to 2 mols of the diepoxide compound are reacted with one mol of the diphenol, polyhydroxypolyethers containing epoxy end groups are produced. When more than 1 up to 2 mols of dihydric phenol are reacted with one mol of diepoxide compounds, polyhydroxy polyethers containing phenolic termination are produced. When the diepoxide compound and the dihydric phenol are reacted in equimolar amounts, high molecular weight polyhydroxy polyethers result.

The products produced by the process of this invention can be used for any of the uses described in the art for epoxy resins and polyhydroxypolyethers resins. Such uses include coating compositions, molding, encapsulating, casting and potting compounds, adhesives, laminates and foams. They can be used as thermoplastic compositions, if high enough in molecular weight, or they can be thermoset by reaction with crosslinking agents, e.g., polyamines, anhydrides, polybasic acids, aminoplast resins, phenolplast resins and the like.

The invention is described in more detail in the following examples. Parts and percentages, unless otherwise indicated, are parts and percentages by weight.

EXAMPLE 1

To a suitable reactor were added 1232.3 parts of the diglycidyl ether of Bisphenol A having an epoxide equivalent weight of 190 and 367.7 parts of Bisphenol A. Heat and agitation were applied to dissolve the Bisphenol A in the diglycidyl ether. When solution was obtained and at 244° F., 1609.5 parts of deionized water were slowly added to the reactor with the temperature dropping to 120° F. Triphenyl phosphine, 8 parts, was added and the temperature was raised to 170° F. Fifty parts of a 10% solution in water of hydroxyethyl cellulose (the viscosity of a 1% solution of the hydroxyethyl cellulose in water was 1200–1450 cps. — Brookfield, 3 spindle, 30 RPM at 25° C.) was added while keeping the temperature at 170° F. After 20 minutes at 170° F., the epoxide equivalent weight of the reactants on solids basis was 242–299. The resinous reactants formed into small beads dispersed in the water. After heating for 4.5 hours at 170° F., the epoxide equivalent weight was 402–422. Heating was continued for 5 hours at 180°–185° F. The epoxide equivalent weight of partially dried resin beads was 583–595. The heat source was removed, cold water was added to the reactor and the reactor was cooled with ice water. Agitation was stopped to let the resin beads settle. The supernatant water was drawn off and the resin beads were washed twice with water. The resin was then placed on a foil pan and dried for 2 days at 212° F. The product had an epoxide equivalent weight of 487–490, a solids content of 97.91%, a Durran's melting point of 67° C., a Gardner-Holdt viscosity at 25° C. and at 40% solids in diethylene glycol monobutyl ether of F-G and a Gardner color of less than 1.

EXAMPLE 2

To a suitable reactor were added 1232.3 parts of the diglycidyl ether of Bisphenol A having an epoxide equivalent weight of 186 and 367.7 parts of Bisphenol A. Heat and agitation were applied raising the temperature to 244° F. Solution of the Bisphenol A in the diglycidyl ether was obtained after 10 minutes at this temperature. Deionized water, 1609.5 parts, was added dropping the temperature to 130° F. Triphenyl phosphine, 8 parts, was then added and the temperature was raised to 200° F. The reactants at this point had formed a white milky slurry. After 30 minutes at 198°–200° F., a resin taffy began to separate from the water. Fifty parts of a 10% solution in water of hydroxyethyl cellulose, as described in Example 1, were added. Resin beads began to form almost immediately. After 15 minutes heating at 200° F., the heat source was removed and cold water was added to cool the reactants. Upon cooling the resin beads stuck together. The excess water was poured off, and the temperature was raised to 200° F. with agitation. Resin beads again formed. The reactants were cooled quickly to 100° F. The resin beads were allowed to settle, the water was drawn off and the resin beads were washed twice with cold water. The resin beads were then placed on foil sheets and were dried at 212° F. for 2 days. The resin had an epoxide equivalent weight of 507, a solids content of 99.3%, a Durran's melting point of 75° C., a Gardner color of less than 1 and a Gardner-Holdt viscosity at 25° F. of G at 40% solids in diethylene glycol monobutyl ether.

EXAMPLE 3

To a suitable reactor were added 1119.2 parts of the diglycidyl ether of Bisphenol A having an epoxide equivalent weight of 186, 480.8 parts of Bisphenol A and 1.6 parts of hydroxyethyl cellulose, described in Example 1. Heat and agitation were applied and the temperature was raised to 240° F. When solution was obtained, 1609 parts of deionized water were added dropping the temperature to 140° F. Triphenyl phosphine, 8 parts, was added and the temperature was raised to 212° F. After heating at 210°–212° F. for 1 hour, solid resin beads had formed. After an additional 20 minutes at 210° F., heating was discontinued and cold water was added. The water was drawn off, and the resin beads were washed twice with cold water. The resin was then dried on aluminum foil trays at 212° F. for 4 hours. The resin had an epoxide equivalent weight of 1021, a solids content of 99.82%, a Durran's melting point of 106° C., and at 40% solids in diethylene glycol monobutyl ether, a Gardner color of less than 1 and a Gardner-Holdt viscosity at 25° C. of T-U.

EXAMPLE 4

To a suitable reactor were added 1038 parts of the diglycidyl ether of Bisphenol A having an epoxide equivalent weight of 186, 562 parts of Bisphenol A and 1.6 parts of hydroxyethyl cellulose, described in Example 1. Heat and agitation were applied raising the temperature to 245° F. When solution was obtained, heating was stopped, and 1600 parts of deionized water were slowly added, lowering the temperature to 135° F. Triphenyl phosphine, 8 parts, was added and the temperature was raised to 200° F. The resinous reactants formed a milky white slurry which after 1 hour and 10 minutes heating at 200° F. began to separate from the water as a taffy. Additional hydroxyethyl cellulose, 1.6 parts, was added. After 15 minutes at 200° F., an additional 12.8 parts of hydroxyethyl cellulose were added. Elongated resin beads formed after 10 minutes heating. Heating was stopped and cold water was added. The water was drawn off and the resin was washed twice with cold water. The resin was then dried at 212° F. for 2 days. The resin had an epoxide equivalent weight of 2770, a solids content of 99.9%, a Durran's melting point of 153° C. and at 40% solids in diethylene glycol monobutyl ether a Gardner color of 1 and a Gardner-Holdt viscosity at 25° C. of $Z_3$-$Z_4$.

EXAMPLE 5

To a suitable reactor were added 885 parts of the diglycidyl ether of Bisphenol A having an epoxide equivalent weight of 186 and 615 parts of 2,2'-bis(3,5-dibromo, 4-hydroxyphenyl) propane. Heat and agitation were applied raising the temperature to 230° F. When solution of the diphenol in the glycidyl ether was obtained, heating was discontinued and 30 parts of a nonionic surfactant, made by polymerizing ethylene oxide with a condensate of propylene oxide with propylene glycol (plutonic F98, obtained from Wyandotte Chemicals Corp.) were added. Deionized water, 1530 parts, was slowly added dropping the temperature to 120° F. Triphenyl phosphine, 4.15 parts, was added and heat was applied raising the temperature to 200° F. The temperature was held at 200° F., while the resinous reactants went from a taffy slurry to finely divided beads. After heating for 2 hours and 30 minutes at 200° F., the acid value of the reactants was reduced tp 0, indicating no free phenolic groups. Heating was discontinued and 2000 parts of cold water were added. The water was drawn off and the resin was washed with an additional 2000 parts of water. The resin produce was then placed on foil sheets and dried at 212° F. for 2 days. The produce had an epoxide equivalent weight of 606, a Durran's melting point of 86° C., and at 40% solids in diethylene glycol monobutyl ether, a Gardner color of 1-2 and a Gardner-Holdt viscosity at 25° C. of B-C.

A resin solution of 80 parts of the resin product and 20 parts of acetone was made. A curing catalyst solution was made by dissolving 4 parts of dicyandiamide in 44 parts of ethylene glycol monoethyl ether plus 0.22 part of benzyldimethylamine. 24.15 parts of the catalyst solution were added to 62.97 parts of the resin solution. After standing for 6 hours at room temperature, the time to cure, referred to as the stroke cure, was determined by placing an amount of the resin-catalyst solution sufficient to form a puddle about the size of a nickel on a cure plate heated at 340° F. and stroking the resin with a wooden tongue depressor while the resin passed from a stringy, to a tacky, to a gummy cure. The stroke cure time was found to be 180-190 seconds.

EXAMPLE 6

To a suitable reactor were added 708 parts of the diglycidyl ether of Bisphenol A having an epoxide equivalent weight of 186 and 291.8 parts of Bisphenol A. Heat and agitation were applied raising the temperature to 240° F. to dissolve the diphenol. When solution was obtained, 75.6 parts of Pluronic F — 98 were added and heating was discontinued. At 200° F., 111.6 parts of deionized water and 5 parts of triphenyl phosphine were added. Heat was reapplied raising the temperature to reflux, 212°-214° F. After 1 hour at 211°-214° F., 57.2 parts of hexamethoxymethyl melamine and 114.4 parts of a 2% solution in water of the hydroxyethyl cellulose described in Example 1 were added. Heating and agitation were continued for 1 hour and 25 minutes. The particle size of the dispersed resin was 10-40 microns. Deionized water, 502.2 parts, was then added. Heating was continued for 55 minutes. The particle size of the dispersed resin was 1-20 microns. The Brookfield viscosity at 25° C. of the dispersion was 800 cps. After 3 days at room temperature, there was about ¼ of an inch settling in the bottom of a quart container. The resin readily redispersed with a small amount of agitation. After two weeks at 125° F., there was a fair amount of hard settling which would not redisperse.

EXAMPLE 7

To a suitable reactor were added 507 parts of the diglycidyl ether of Bisphenol A having an epoxide equivalent weight of 186, 353 parts of tetrabromo Bisphenol A, 2.3 parts of triphenyl phosphine, 142 parts of a 40% solution in water of a surfactant made by reacting 2 mols of polyoxyethylene glycol (Carbowax 6000 obtained from Union Carbide) with 1 mol of a glycidyl polyether of Bisphenol A having an epoxide equivalent weight of 468, and 61 parts of ethylene glycol monoethyl ether. Heat and agitation were applied raising the temperature over a 30 minute period to 204° F. After heating at 203°-204° F. for 2.5 hours, the acid value of a check-cut of the reactants was 0 indicating complete reaction of the phenol. Deionized water, 84 parts, was added and after 20 minutes heating at 197°-200° F., the particle size of the dispersed resin was 1-5 microns. Additional water, 380 parts, was then added over 1 hour and 50 minutes with the temperature dropping to 120° F. After straining through an 80 mesh nylon bag, the dispersion at 60.3% solids had a viscosity at 25° C. of 1850 cps. and a pH of 7.1. The glycidyl polyether resin had an epoxide equivalent weight of 604 on solids basis.

EXAMPLE 8

To a suitable reactor were added 617.7 parts of the diglycidyl ether of Bisphenol A having an epoxide equivalent weight of 186 and 429.3 parts of tetrabromobisphenol A. Heat and agitation were applied raising the temperature to 230° F. at which completely mixed the phenol had dissolved in the glycidyl ether. Heating was discontinued and 70 parts of Pluronic F-98; 120 parts of a 2% solution in water of the hydroxyethyl cellulose described in Example 1, and 2.83 parts of triphenyl phosphine were added. The temperature was lined out at 200° F. and was held at this temperature for 2 hours and 20 minutes until the acid value of the reactants was 0. Hexamethoxymethyl melamine, 60 parts, were added and when completelymixed in, slow addition of 117 parts of warm deionized water was begun and continued over a 45 minute period with the temperature at 185°-190° F. The particle size of the dispersed resin was 1-10 microns. After 45 minutes heating and stirring at 185°-190° F., the particle size was 1-5 microns. Cold water, 934 parts, was then added over a 15 minute period with the temperature dropping to 160° F. The dispersion was allowed to cool to 100° F., and was filtered through an 80 mesh nylon bag. The dispersion had a solids content of 50%, a viscosity at 25° C. of 300 cps. and a weight per gallon of 9.76 lbs.

EXAMPLE 9

To a suitable reactor were added 507 parts of the diglycidyl ether of Bisphenol A having an epoxide equivalent weight of 186, 352 parts of tetrabromobisphenol A, 54.5 parts of deionized water and 2.3 parts of triphenyl phosphine. Heat was applied raising the temperature to 210° F. The temperature was held at 210°–211° F., for 3 hours until the acid value reached 0. A surfactant solution, 141 parts, at 40% solids in water, which is an adduct of 2 mols of Carbowax 6000 and one mol of the glycidyl polyether of Bisphenol A having an epoxide equivalent weight of 186, was then added over 10 minutes with the temperature dropping to 200° F. After heating the agitating at 200° F. for 20 minutes, the particle size of the dispersion was 1–4 microns. After an additional 15 minutes stirring, 28.4 parts of hexamethoxymethyl melamine were added and heating was discontinued. Deionized water, 490.5 parts, was then slowly added over 1 hour and 10 minutes. The dispersion was cooled to below 120° F. and was filtered through an 80 mesh nylon bag. The resulting dispersion had a solids content of 60.49%, a Brookfield viscosity at 25° C. of 5,600 cps. (#3 spindle, 20 RPM) 4,100 cps. (#3spindle, 10 RPM) and a particle size of 1–3 microns. The epoxide equivalent weight of the dispersed resin was 578 on solids basis. After 18 days at room temperature there was no settling of the dispersion and after an additional 11 days, only slight settling. In the hot box at 125° F. for the same period, slight settling which was easily redispersed was noted.

It is to be understood that the foregoing detailed description is given merely by way of illustration and that many variations may be made therein without departing from the spirit of the invention.

What is claimed is:

1. In a process for preparing higher molecular weight polyhydroxypolyether resins by the reaction of an epoxide compound which contains more than one 1,2-epoxy groups per molecule with a dihydric phenol in the molar ratio of 2:1 to 1:2 using as a catalyst an organic phosphine, a tertiary amine, or a quaternary ammonium or phosphonium compound, the improvement which comprises conducting the reaction in water at a temperature of about 80° C. to about 100° C. and, in the presence of a nonionic dispersant, recovering the polyhydroxypolyether resin in the form of solid granules of as a stable dispersion.

2. The process of claim 1 wherein the nonionic dispersant is present throughout the reaction.

3. The process of claim 1 wherein the nonionic dispersant is added after the initial reaction of epoxide compound and dihydric phenol has been completed.

4. The process of claim 1 wherein the reaction is conducted at a solids content of about 40 weight percent to about 90 weight percent.

5. The process of claim 4 wherein the solids content is about 40 weight percent to about 75 percent and the reaction product is recovered as solid granules.

6. The process of claim 4 wherein the solids content is about 75 weight percent to about 90 weight percent and the reaction product is recovered as a stable dispersion.

7. The process of claim 1 wherein the catalyst is used in the amount of about 0.3 to about 3.0 weight percent based on the weight of reactants.

8. The process of claim 1 wherein the catalyst is triphenyl phosphine.

9. The process of claim 1 wherein the nonionic dispersant is present in the amount of about 0.1 to about 15 weight percent based on the weight of reactants.

10. The process of claim 1 wherein the nonionic dispersant is hydroxyethyl cellulose.

11. The process of claim 1 wherein the nonionic dispersant is a block polymer of ethylene oxide and polypropylene glycol having an experimentally determined hydrophile-lipophile balance of about 24 to about 32.

12. The process of claim 1 wherein the nonionic dispersant is a polymer made by reacting polyoxyethylene glycols having a molecular weight of about 2,000 to about 20,000 with polyglycidyl polyethers of polyhydric phenols having a molecular weight of about 300 to about 2,000 in a molar ratio of 2:1 to 6:5, said dispersant having a calculated hydrophile-lipophile balance of about 16 to about 19.5.

13. The process of claim 1 wherein the epoxide compound is the glycidyl polyether of p,p′-dihydroxydiphenyl propane.

14. The process of claim 13 wherein the dihydric phenol is p,p′-dihydroxydiphenyl propane.

15. The process of claim 13 wherein the dihydric phenol is 2,2′-bis(3,5-dibromo, 4-hydroxyphenyl) propane.

* * * * *